United States Patent
Rosenbluth et al.

(10) Patent No.: US 12,468,543 B2
(45) Date of Patent: Nov. 11, 2025

(54) BOOT INITIALIZATION WITHOUT HOME NODE INVOLVEMENT

(71) Applicant: Mellanox Technologies, Ltd., Yokneam Illit (IL)

(72) Inventors: Mark Rosenbluth, Uxbridge, MA (US); Rui Xu, Marlborough, MA (US); Diane Orf, Natick, MA (US); Michael Cotsford, Medway, MA (US); Shreya Tekade, Framingham, MA (US); David Woods, Groton, MA (US)

(73) Assignee: Mellanox Technologies, Ltd., Yokneam (IL)

( * ) Notice: Subject to any disclaimer, the term of this patent is extended or adjusted under 35 U.S.C. 154(b) by 243 days.

(21) Appl. No.: 18/133,971

(22) Filed: Apr. 12, 2023

(65) Prior Publication Data

US 2024/0231834 A1 Jul. 11, 2024

Related U.S. Application Data

(60) Provisional application No. 63/437,608, filed on Jan. 6, 2023.

(51) Int. Cl.
*G06F 9/4401* (2018.01)

(52) U.S. Cl.
CPC .................................. *G06F 9/4403* (2013.01)

(58) Field of Classification Search
CPC ..................................................... G06F 9/4403
See application file for complete search history.

(56) References Cited

U.S. PATENT DOCUMENTS

| | | | |
|---|---|---|---|
| 10,394,653 B1 * | 8/2019 | Rosenbluth ........... | G06F 11/141 |
| 2003/0120910 A1 * | 6/2003 | Schmisseur ............... | G06F 1/24 |
| | | | 713/2 |
| 2004/0133748 A1 * | 7/2004 | Yang .................... | G06F 12/0817 |
| | | | 711/E12.027 |
| 2006/0005005 A1 * | 1/2006 | Lee ........................ | G06F 9/4401 |
| | | | 713/2 |
| 2019/0068873 A1 * | 2/2019 | Rodriguez, II .... | G02B 27/0101 |

* cited by examiner

*Primary Examiner* — Nimesh G Patel
(74) *Attorney, Agent, or Firm* — Lowenstein Sandler LLP

(57) ABSTRACT

A system includes a functional unit having a processor and address management circuitry. The address management circuitry is to receive a request from the processor, where the request is associated with a boot process initialized at the processor. The address management circuitry is to determine a bit stored at the address management circuitry has a first value indicating to associate the request with a first node identifier associated with a memory region storing data associated with the boot process instead of a second node identifier associated with nodes storing physical locations associated with a memory address of the request. The address management circuitry can further transmit the request with the first node identifier to logic at a first node coupled to the memory region responsive to determining the bit has the first value.

20 Claims, 6 Drawing Sheets

BOOT INITIALIZATION WITHOUT HOME NODE INVOLVEMENT

RELATED APPLICATIONS

This application claims priority to provisional U.S. Application No. 63/437,608 filed Jan. 6, 2023, the entire contents of which is hereby incorporated by reference.

TECHNICAL FIELD

At least one embodiment pertains to processing resources used to perform and facilitate boot initialization without home node involvement. For example, at least one embodiment pertains to bypassing the home node during a boot initialization.

BACKGROUND

An integrated circuit (e.g., a chip, system on a chip, system-on-chip, etc.) can include multiple functional units arranged in an array. For example, a data processing unit (DPU) can include multiple functional units (e.g., processors, central processing units (CPU), graphics processing units (GPUs), etc.), where different functional units perform different functions. For example, some functional units include processor cores, other functional units communicate with peripheral component interconnect express (PCIe) links, and some functional units handle device interrupts (e.g., handle signals indicating an error at the device that should be attended to immediately). Because of the multiple functional units, the integrated circuit can utilize a cache coherency protocol to ensure data in the system is coherent. For example, the integrated circuit could use a directory based (e.g., the status of memory is kept in one location called the directory) or a snoop-based cache coherency protocol (e.g., each cache that has a copy of the data also has a copy of the memory status and there is no centralized location for maintaining the coherency). One example of a directory-based cache coherence protocol can include using local and home nodes to maintain cache coherency. For example, local nodes are nodes where a request originates (e.g., a functional unit or processor), and the home node is a node where the memory location and directory entry of an address reside—e.g., the home node can store a physical location or physical address corresponding to memory addresses received from the local node. In some systems, there can be multiple home nodes for the address space, where an address component (e.g., system address manager) can receive an address and identify a node that stores the corresponding physical address. Accordingly, the integrated circuit can rely on the home nodes to determine the physical locations of where data is stored for a respective memory request (e.g., read request). The integrated circuit can program the address component to identify the node and determine the physical location during an initialization process. However, to complete the initialization process, the system has to access memory—e.g., access boot instructions or data associated with a boot procedure. Because the address component is not programmed at a start of the initialization process, the system cannot identify home nodes and the location of the boot memory. Accordingly, some solutions require a different process to access the boot memory during the initialization procedure.

BRIEF DESCRIPTION OF DRAWINGS

Various embodiments in accordance with the present disclosure will be described with reference to the drawings, in which.

DETAILED DESCRIPTION

Figure 1:
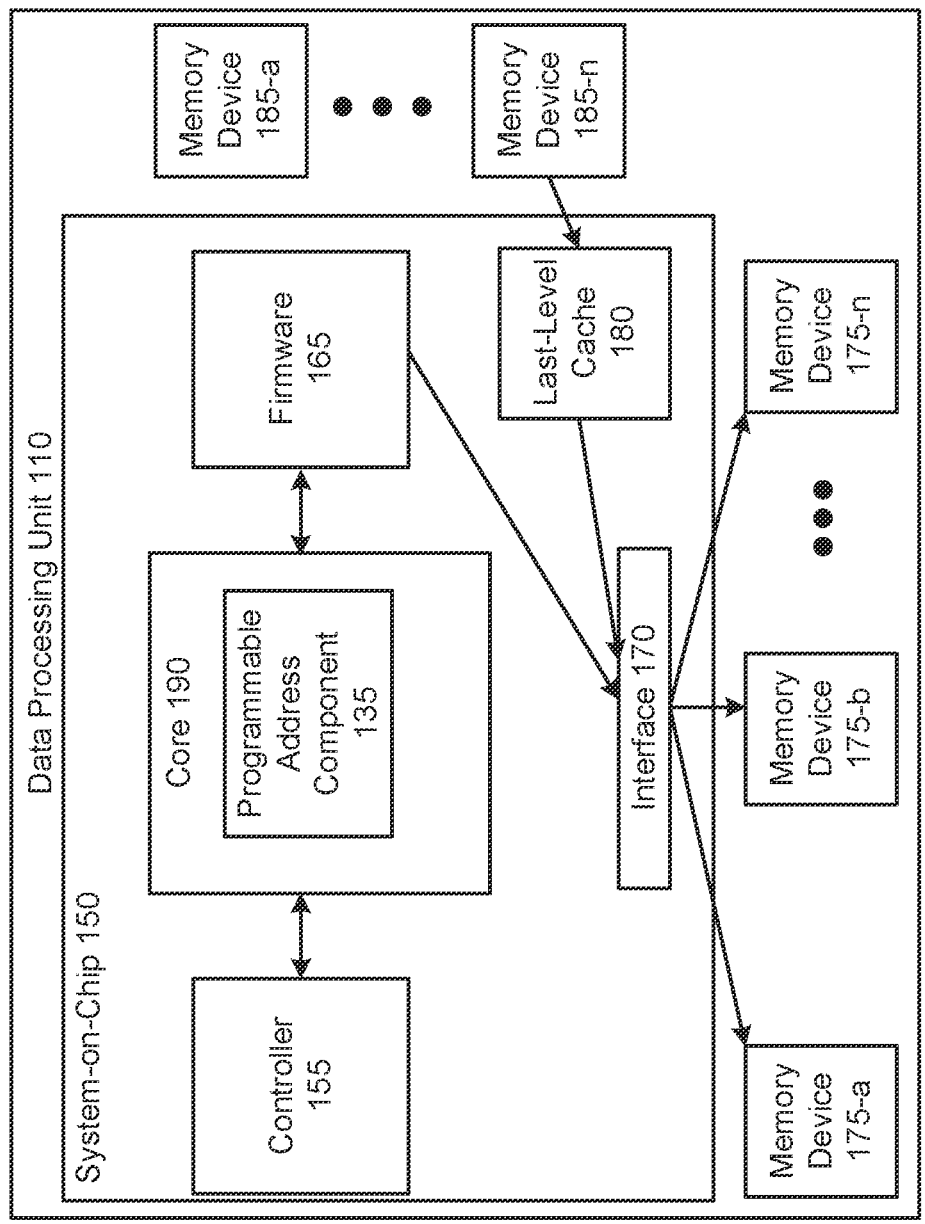
FIG. 1 illustrates an example communication system, in accordance with at least some embodiments.

As described above, integrated circuits can include multiple functional units (e.g., processors, central processing units (CPU), graphics processing units (GPUs), etc.), where different functional units perform different functions or operations. For example, some functional units include processor cores, other functional units communicate with peripheral component interconnect express (PCIe) links, and some functional units handle device interrupts (e.g., handle signals indicating an error at the device that should be attended to immediately). In some examples, the functional units can communicate with each other to initiate, process, or execute operations.

In some examples, the integrated circuit can utilize a cache coherency protocol to ensure data within the system is reliable and coherent—e.g., that each functional unit is processing or operating with a same copy of data. As described above, the integrated circuit could use a directory based (e.g., the status of memory is kept in one location called the directory) or a snoop-based cache coherency protocol (e.g., each cache that has a copy of the data also has a copy of the memory status and there is no centralized location for maintaining the coherency). In one example, the integrated circuit can utilize a directory-based cache coherence protocol that includes using local and home nodes to maintain cache coherency. For example, local nodes are nodes where a request originates (e.g., a functional unit or processor), and the home node is a node where the memory location and directory entry of an address reside e.g., the home node can store a physical location or physical address corresponding to memory addresses received from the local node. In some systems, there can be multiple home nodes for the address space. In such examples, an address component (e.g., system address manager) can be programmed with a node identification table during an initialization process—e.g., the address component can be programmed to receive an address and identify a node that stores the corresponding physical address.

However, to program the address component during the initialization process, the integrated circuit has to access memory—e.g., access boot instructions or data associated with the boot procedure. During normal operations, the system can rely on the address component to identify the respective home node to determine the location of the data. As the address component is not programmed at a start of the initialization process, the system cannot use the address component to determine a node identification. Some solutions can attempt to hardcode the address component to select a respective home node during an initialization process—e.g., designate a home node for the initialization process. However, such home nodes would be in a specific mode to deal with the request during the initialization process—e.g., it can limit the home node functionality. Additionally, as integrated circuits get larger, they can include multiple different replaceable components—e.g., any of the functional units of the integrated circuit could be replaced with a new functional unit. Accordingly, the physical location of a designated home node could change if the functional unit is replaced—e.g., configuring the address component to always select a respective home node during the initialization process can lead to hardware errors if the respective home node location is moved or replaced.

Advantageously, aspects of the present disclosure can address the deficiencies above and other challenges by utilizing a programmable bit in an address component (e.g., system address manager). For example, a value of the programmable bit can indicate to associate an incoming memory address with a first node identifier (e.g., an identification associated with memory storing boot instructions) or with a second node identifier (e.g., an identification associated with a node of one or more nodes storing physical locations associated with a memory address)—e.g., a first value of the bit can indicate to associate with the first node identifier and a second value of the bit can indicate to associate with the second node identifier. In one example, the programmable bit can have the first value during an initialization process. A functional unit (e.g., processor) can initiate the initialization process and transmit a request to the address component. In such examples, the address manager can determine the bit has the first value and associate the request with the memory storing boot instructions. The processor can receive the data and program a node identification table at the address component. As the home nodes are not utilized during the initialization process, the system can fail to be cache coherent. Accordingly, the integrated circuit can erase all system caches after programming the node identification table. After erasing the caches, the integrated circuit can program the bit at the address component to have the second value. In such examples, the address component can determine the bit has the second value and the second node identifier (e.g., an identifier associated with a home node) for subsequent requests—e.g., the address component can utilize the home after the initialization process is complete.

By utilizing the programmable bit at the address component, the integrated circuit can perform initialization operations without using home nodes. This can enable the system to configure the address manager using software, enabling flexibility even when functional units are replaced within the integrated circuit.

FIG. 1 illustrates an example system 100. In at least one embodiment, the system 100 can include a data processing unit (DPU) 110. In some embodiments, DPU 110 can include a software-programmable multi-core central processing unit (CPU)—e.g., the DPU 110 can include a multi-core 190 central processing unit (CPU) in an arm architecture (e.g., core 190) to facilitate processing data. In some embodiments, the DPU 110 can also include programmable acceleration engines capable of offloading and utilized in application performances for artificial intelligence or machine learning. In some embodiments, the DPU 110 can be incorporated in a smart network interface controller (NIC)—e.g., DPU 110 can be an example of network interface controllers (NICs). In at least one embodiment, DPU 110 can be an example of an NVIDIA® BlueField® data processing unit (DPU).

As illustrated in FIG. 1, in some embodiments, the DPU 110 can include a system-on-chip (SOC) 150, memory devices 175, and memory devices 185. In at least one embodiment, the DPU 110 supports directly reading or writing to attached local peripheral memory devices 175 (e.g., NVM express (NVMe) drives or other storage devices) via a storage sub-system in response to remote initiator requests (e.g., content transfer requests received from devices over a network to which the data communication device is connected). In at least one embodiment, the DPU 110 can include memory devices 185 (e.g., a random-access memory (RAM) (e.g., Double Data Rate (DDR) memory)) which are used to transfer content between the data communication device and the memory devices 175, and vice-versa. In some embodiments, memory devices 175 can be coupled to the SOC 150 via interface 170. In at least one embodiment, the interface 170 is an example of a peripheral component interconnect express (PCIe) interface.

In some embodiments, the SOC 150 can further include a controller 155 and firmware 165. In some embodiments, the SOC 150 can include a multi-core central processing unit (CPU) in an arm architecture (e.g., core 190) to facilitate processing data. In such embodiments, the core 190 can couple the controller 155 with the firmware 165. In some embodiments, the core 190 can include a programmable address component 135. In one embodiment, the programmable address component 135 is configured to receive memory addresses (e.g., receive requests that include memory addresses) and associate a node identifier with the memory address. In one embodiment, the programmable address component 135 can associate the node identifier with the memory address based on a value of a programmable bit. For example, the programmable address component 135 can associate the memory address with a boot region (e.g., a first node identifier) when the programmable bit has a first value (e.g., zero (0)). In other embodiments, the programmable address component 135 can associate the memory address with a home node identifier when the programmable bit has a second value (e.g., one (1)). Additional details about the programmable address component 135 are described with reference to FIGS. 2-4.

In at least one embodiment, the SOC 150 can include a last-level cache (LLC) 180 shared by the controller 155 and firmware 165. In at least one example, the controller 155 is an example of a network interface controller coupling the DPU 110 to a user device or a computer network (e.g., a cloud network).

In at least one embodiment, system 100 can correspond to one or more of a Personal Computer (PC), a laptop, a tablet, a smartphone, a server, a collection of servers, or the like. The system 100 can include or be included a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, system 100 can correspond to servers offering information resources, services, and/or applications to user devices, client devices, or other hosts in the system 100. The system 100 can use communication networks that may be used to connect the DPU 110 to other devices, including an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like.

The system 100 can include processing circuitry (not illustrated), which can comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application-specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In one embodiment, the DPU 110 can include one or more functional units that correspond to the SOC 150—e.g., one or more functional units that represent the controller 155, core 190, firmware 165, last-level cache 180, etc., as described with reference to FIGS. 2A and 2B.

Figure 2A:
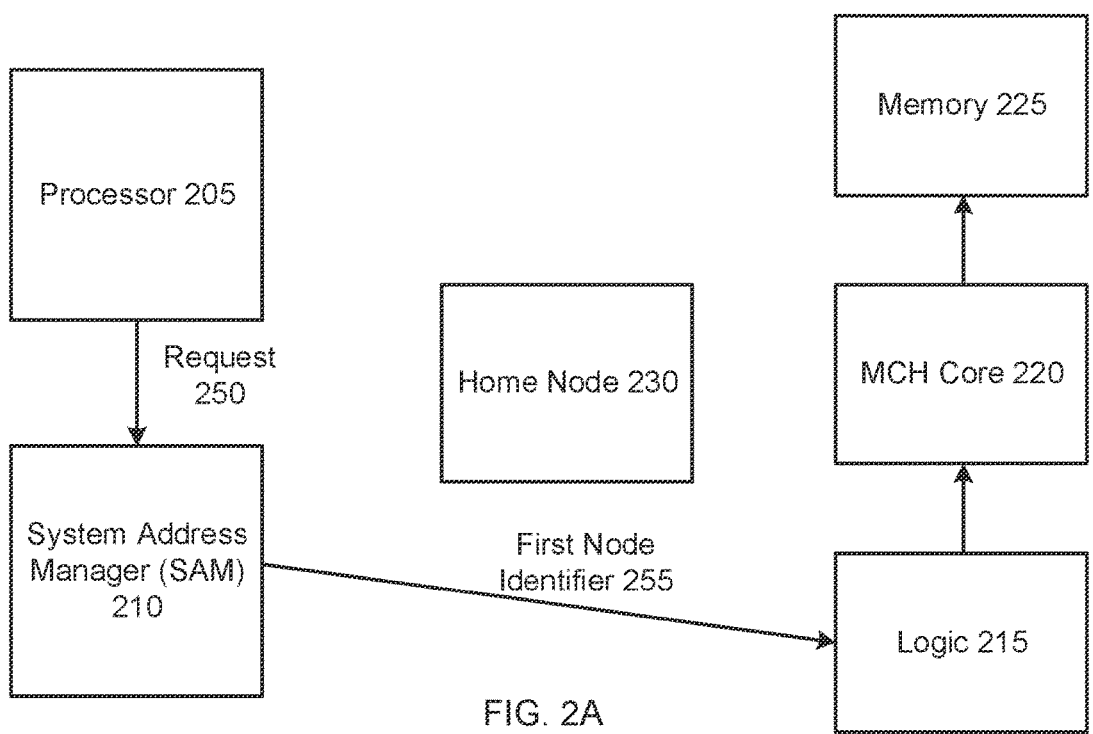
FIGS. 2A and 2B illustrate a flow diagram for boot initialization without home node involvement, in accordance with at least some embodiments.
Figure 2B:
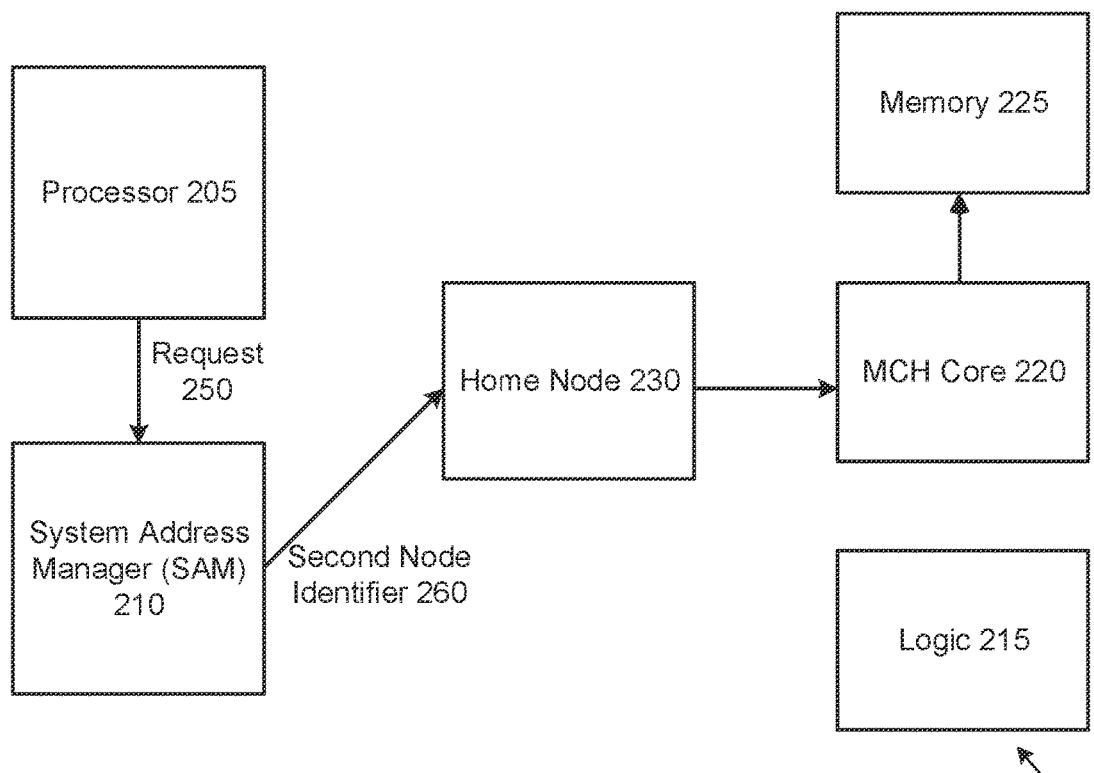

FIGS. 2A and 2B illustrate diagrams 200 and 201 for boot initialization and operations subsequent to the boot initialization, according to at least one example embodiment. In at least one embodiment, diagram 200 and diagram 201 can include a processor 205, a system address manager (SAM) 210, logic 215, a memory controller hub (MCH) core 220, memory 225, and a home node 230. In at least one embodiment, the SAM 210 can be an example of the programmable address component 135 as described with reference to FIG. 1. In some embodiments, the diagrams 200 and 201 can include additional components—e.g., although one processor 205 or one home node 230 is shown, there can be any number of home nodes (e.g., sixteen (16)) or any number of processors 205. In some embodiments, the components illustrated in FIGS. 2A and 2B can be part of one or more functional units included in system 100. In one example, processor 205 and SAM 210 can be considered one functional unit, logic 215, MCH core 220, and memory 225 can be considered a second functional unit, and a home node 230 can be a third functional unit—e.g., one or more functional units can be included in controller 155, core 190, firmware 165, interface 170, and/or last-level cache 180. In one embodiment, diagram 200 illustrates a process flow for an initialization process (e.g., boot process, boot procedure, initialization operation, start-up, boot up, etc.), and diagram 200 illustrates a process flow for executing operations after the initialization operation is complete.

In one embodiment, as illustrated by diagram 200, a processor 205 can transmit a request (e.g., a read request) to SAM 210. In at least one embodiment, the processor 205 is included in the core 190 as described with reference to FIG. 1. In some embodiments, the processor 205 can initiate a boot process—e.g., initiate a start-up of at least one functional unit in system 100. In such embodiments, the processor 205 can transmit the request 250 to request boot instructions or boot data—e.g., data associated with the boot operation. In at least one embodiment, the request 250 can include a memory address.

In some embodiments, SAM 210 is configured to receive the memory address in the request 250 from the processor 205. In at least one embodiment, the SAM 210 is configured to determine a location associated with the memory address. For example, during the initialization process, the SAM 210 can receive the memory address and determine whether a programmable bit has a first value. In one embodiment, the first value can indicate to associate any received memory addresses during the initialization with a first node identifier 255. In one example, the first node identifier 255 can correspond to memory 225 storing the boot instructions—e.g., the SAM 210 can identify the memory 225 storing the boot instructions based on the programmable bit having the first value. In such examples, the SAM 210 can determine the first node identifier 255 and transmit the identification to logic 215—e.g., the SAM 210 can bypass utilizing the home node 230 during the initialization process. In that, the SAM 210 can assign a target identification of a cluster storing the boot memory instead of assigning a home node 230 node identification as illustrated in diagram 201.

Logic 215 (e.g., a boot handler) can handle boot requests or operations during the initialization process while the home node 230 is bypassed. For example, the logic 215 is to receive the first node identifier 255 (e.g., the identification associated with the boot memory) from the SAM 210. The logic 215 can process the request and transmit the necessary information to the memory 225—e.g., process the request and transmit the request to obtain the data requested by the processor 205. In at least one embodiment, logic 215 can communicate requests to memory 225 via the MCH core 220. In one example, during normal operations (e.g., operations after the initialization), the MCH core 220 can receive requests from the home node 230—e.g., the MCH core 220 can communicate with the home node 230 during normal operations. In one embodiment, the MCH core 220 can be aligned with a coherent hub interface (CHI) protocol. To ensure the MCH core 220 is still aligned with the CHI protocol and operational during the initialization request, logic 215 can convert any incoming requests into a format the MCH core 220 can process. For example, in one embodiment, the MCH core 220 can accept only write without snoop (e.g., writenosnp) or read without snoop (e.g., readnosnp) operation codes—e.g., non-snooped transactions that do not snoop copies of data in caches and instead read or write directly from or to the memory 225. Accordingly, logic 215 can translate any received write opcode to writenosnp and any received read opcode to readnosnp. For example, each operation code can be assigned a value or a number. The logic 215 can receive an operation code and translate it to the writenosnp or readnosnp and transmit the value associated with the writenosnp or readnosnp to the MCH core 220. In one embodiment, the logic 215 can translate at least the following write operation codes to writenosnp: writeevictfull (e.g., evictions of unique clean lines), writecleanptl (e.g., a reserved operation code), writecleanfull (e.g., evictions of dirty lines from a level three (3) cache), writeuniqueptl (e.g., a reserved operation code), writeuniquefull (e.g., cacheable writes of a full cache line that are not allocating into level one (1), level two (2), or level three (3) cache, writebackptl (e.g., a reserved operation code), writebackfull (e.g., evictions of dirty lines from level one (1), level two (2), or level three (3) cache), writenosnpptl (e.g., non-cacheable store instructions), writebacknosnpfull (e.g., non-cacheable store instructions or evictions of non-shareable cache lines), writebackstash (e.g., a reserved operation code). Similarly, the logic 215 can translate at least the following read operation codes to readnosnp: readshared (e.g., a read request to a snoopable address region), readclean (e.g., cache data linefills started by a load instruction), readonce (e.g., cacheable loads that are not allocating into the cache), readunqiue (e.g., cache data linefills started by a store instruction), readoncecleaninvalid (e.g., a request to obtain a snapshot of coherent data), readoncemakeinvalid (e.g., a request to obtain a snapshot of coherent data where cached data is used once), readnotshareddirty (e.g., read request to a snoopable address region for caches that do not support shareddirty state).

In at least one embodiment, the MCH core 220 does not receive dataless transactions—e.g., during normal operations, the home node 230 handles the dataless transactions. In such embodiments, the logic 215 can reply to any dataless transactions during the initialization—e.g., handle the following operation codes; evict (e.g., that a cache line has been evicted from a local cache), cleanunqiue (e.g., the cache line is not modified with respect to a system copy of data), makeunique (e.g., request a unique copy of a cache line and remove all other copies), stashonceunique (e.g., request that includes a node identification of another request node), stashoncesahred (e.g., request that includes a node identification of another request node and optionally an identification of a logical processor within that respective node), cleanshared (e.g., request that all cached copies are changed to a non-dirty state), cleansharedpersist (e.g., request that all cached copies are changed to a non-dirty state, dirty cached copy is written back to a point of persistence (POP) or a final destination), cleaninvalid (e.g., request to make all cached copies invalid and cached dirty copies are written to memory), makeinvalid (e.g., request that all cached copies are invalidated and permits dirty copies to be discarded). Additionally, logic 215 can transmit one request or transaction at a time to the MCH core 220—e.g., the MCH core 220 can fail to deal with multiple requests with the same address, so the logic 215 can ensure only one request is sent at a time. In such examples, the logic 215 can wait until a transaction is complete (e.g., aligned with the CHI protocol) before transmitting the next transaction to the MCH core 220. In one embodiment, the logic 215 can append data hints on databus identifier (DBID) messages. In some embodiments, the logic 215 can also amend the request so it can be processed by the MCH core 220. For example, the logic 215 can overwrite a home node identification field of the request to ensure the request is completed properly.

In one embodiment, MCH core 220 is to receive operation codes from the logic 215 and access the memory 225 accordingly—e.g., enable direct reads from or write to the memory 225. In at least one embodiment, the memory 225 stores the boot instructions. In one embodiment, the memory 225 also stores information associated with a node identification table for the SAM 210, as described with reference to diagram 201 and FIGS. 3 and 4. Accordingly, the processor 205 can program the node identification table and then clear all caches in the system 100. After programming the node identification table and clearing the caches, the processor 205 can program the bit at the SAM 210 to have the second value and perform operations as described with reference to FIG. 2B.

As illustrated in diagram 201 of FIG. 2B, the processor 205 can transmit a request 250 to the SAM 210. In some embodiments, SAM 210 is configured to receive the memory address in the request 250 from the processor 205.

In at least one embodiment, the SAM 210 is configured to determine a location associated with the memory address. For example, during the initialization process, the SAM 210 can receive the memory address and determine whether a programmable bit has the second value. In one embodiment, the second value can indicate to associate any received memory addresses during the initialization with a home node 230 (e.g., with a second node identifier). In such examples, the SAM 210 can determine the home node 230 identification and associate the address with the home node 230 as described with reference to FIGS. 2 and 3. After the determining the second node identifier, the SAM 210 can transmit the request to the home node 230.

In at least one embodiment, home node 230 can store physical locations of data associated with a received memory address. For example, the home node 230 can receive the request from the SAM 210 and determine a physical location in the memory 225 corresponding to the request. In some embodiments, the home node 230 can also maintain a cache coherency for the system 100. That is, each request associated with the respective memory address can go to the home node 230. Accordingly, the home node 230 can monitor copies of the data accessed and update the location or the cache when necessary—e.g., mark caches invalid, evict caches, or update data stored at caches. During the normal operation, the home node 230 can also communicate requests to the MCH core 220 to access the memory 225 to read or write the respective data.

Figure 3:
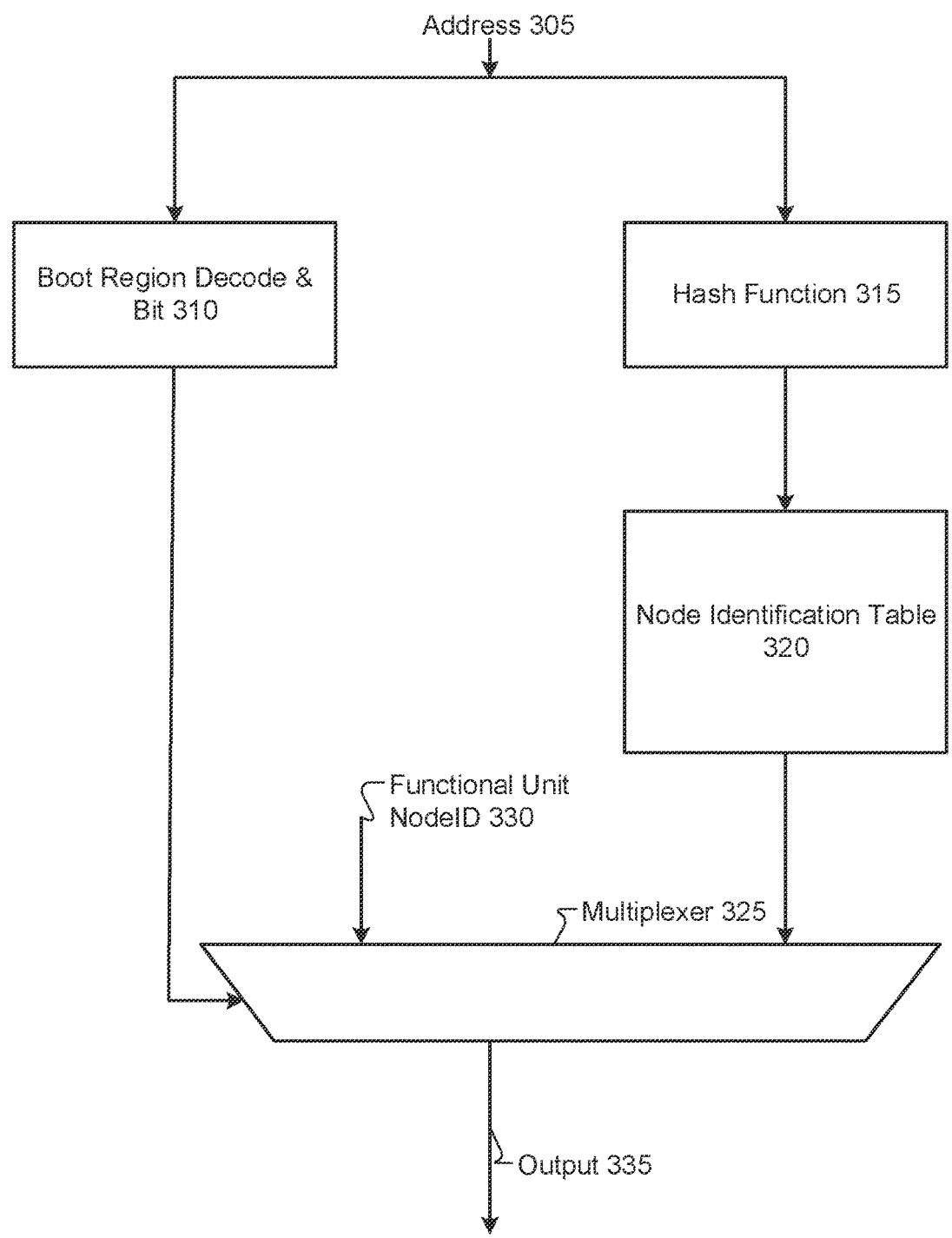
FIG. 3 is an example system address manager, in accordance with at least some embodiments.

FIG. 3 illustrates a system address manager (SAM) 210 for boot initialization without home node involvement, according to at least one example embodiment. In one embodiment, SAM 210 can be the system address manager described with reference to FIG. 2. In at least one embodiment, the SAM 210 is a hardware component with programmable registers (e.g., the programmable node identification table 320). In one embodiment, the SAM 210 can include a boot region decode and bit 310, a hash function 315, a node identification table 320, a multiplexer 325, and an output 335.

As described with reference to FIG. 2, SAM 210 can receive an address 305 (e.g., a memory address) and determine a node identification responsive to receiving the address. For example, the SAM 210 can receive an address 305. In at least one embodiment, the SAM 210 can determine a value for a programmable bit in the boot region decode and bit 310. In one embodiment, the SAM 210 can determine a first value for the bit (e.g., a value zero (0)). In such embodiments, the SAM 210 can determine to associate the address 305 with a first node identifier (e.g., the functional unit node identity (ID) 330). That is, the SAM 210 can be configured to associate the address 305 with the functional unit nodeID 330 when the bit has the first value—e.g., the SAM 210 can associate the address 305 with a memory region storing boot instructions during an initialization operation based on the bit having the first value. Accordingly, the SAM 210 can output the functional nodeID 330 via the multiplexer 325 when the bit has the first value—e.g., the node identification table 320 can fail to be programmed at a time of the initialization operation so the SAM 210 can select the functional unit nodeID 330 instead.

In examples where the bit has the first value and the functional unit nodeID 330 is output, a processor (e.g., processor 205 as described with reference to FIG. 2) can receive the boot instructions and program the node identification table 320. In one embodiment, software of the processor can program registers in a configuration space during the initialization. In at least one embodiment, the node identification table 320 is within the configuration space. Accordingly, software of the processor can program the node identification table 320 during the initialization. For example, the processor can program the node identification table 320 with node identities corresponding to an address space stored—e.g., the node identification table 320 can be programmed to enable the SAM 210 to determine a node storing a physical location associated with the incoming address 305. In one embodiment, the software can program the node identification table utilizing configuration space requests and responses (e.g., using cr_resp and cr_request). In one embodiment, the node identification table 320 can include one programmable register/table (e.g., entry) for each node—e.g., the node identification table can include sixteen entries for sixteen home nodes. After the node identification table 320 is programmed, the processor can erase all system caches and program the bit to have a second value.

In one embodiment, the SAM 210 can receive the address 305 and determine the bit has a second value (e.g., one (1)). In such embodiments, the SAM 210 can utilize the hash function 315 (e.g., a combination of logic gates) and the node identification table 320 to determine a node identification associated with the address 305—e.g., determine which home node stores the physical location corresponding to the address 305. For example, the hash function 315 can receive an address [39:6] as an input and generate a four (4) bit value. In one example, the four-bit value can be an index for the node identification table 320. In one embodiment, the index can enable the node identification table 320 to determine a home node that stores the physical location—e.g., the node identification table 320 can determine the home node identification in response to receiving the four-bit value. In one example, utilizing the hash function 315 can ensure the network traffic is distributed evenly among each of the home nodes.

Multiplexer 325 is configured to receive the outputs of the boot region decode and bit 310 and/or node identification table 320 and generate an output 335. In one example, the multiplexer 325 is configured to output the functional unit nodeID 330 when the bit has the first value. In another embodiment, the multiplexer 325 is configured to output a home node identification when the bit has the second value.

Figure 4:
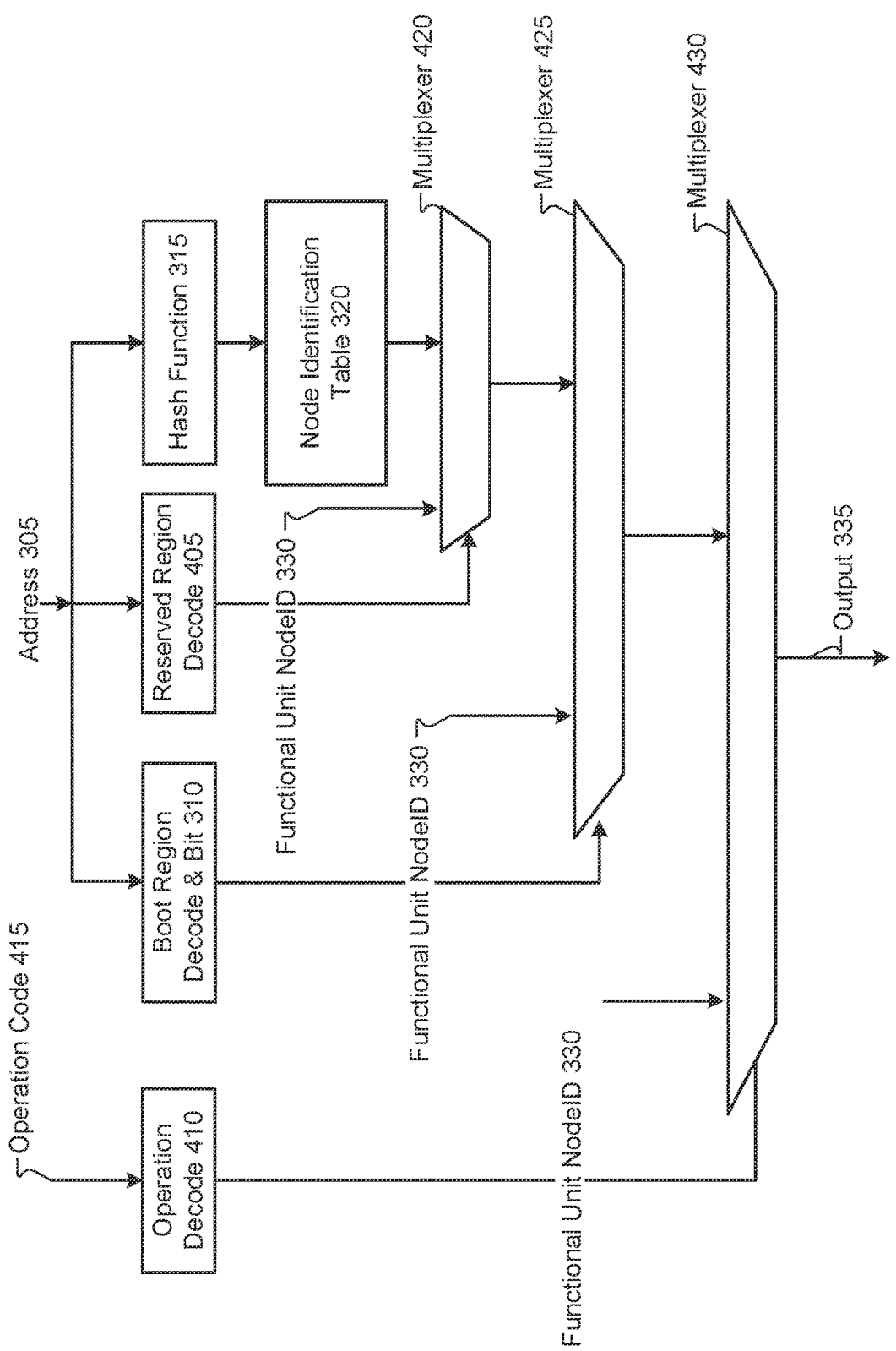
FIG. 4 illustrates an example system address manager, in accordance with at least some embodiments.

FIG. 4 illustrates a system address manager (SAM) 210 for boot initialization without home node involvement, according to at least one example embodiment. In one embodiment, SAM 210 can be the system address manager described with reference to FIGS. 2 and 3. In at least one embodiment, the SAM 210 is a hardware component with programmable registers (e.g., the programmable node identification table 320). In one embodiment, the SAM 210 can include a boot region decode and bit 310, a hash function 315, a node identification table 320, and an output 335 that perform the methods and operations described with reference to FIG. 3. In at least one embodiment, the SAM 210 can further include a reserved region decode 405, an operation decode 410, multiplexer 420, multiplexer 425, and multiplexer 430.

In at least one embodiment, the SAM 210 is configured to receive an address 305—e.g., a memory address included in a request transmitted by a processor 205 as described with reference to FIG. 2. In at least one embodiment, the SAM 210 can decode the address 305 and determine it is associated with a reserved region—e.g., a region that is not associated with an address space of the home nodes. For example, the reserved region decode 405 can decode the address 305 and determine the address 305 is associated with the reserved region. In such embodiments, the SAM 210 can refrain from utilizing the hash function 315 or the node identification table 320—e.g., the SAM 210 can refrain from attempting to associate the address 305 with a node identifier when the address 305 is associated with the reserved region. In at least one embodiment, the SAM 210 can associate the functional unit nodeiD 330 with the address 305 when the address 305 corresponds to the reserved region. For example, a functional unit can include the reserved region (e.g., store data associated with the reserved region). In such examples, the SAM 210 can enable the processor to access the reserved region by associating the address 305 with the reserved region.

In at least one embodiment, the SAM 210 is configured to receive an operation code 415. In some embodiments, the SAM 210 can receive both the address 305 and the operation code 415. In one embodiment, the SAM 210 can determine an output 335 based on received operation code. For example, the operation code 415 can indicate to perform an operation associated with a protocol utilized by the system 100. For example, the system 100 can utilize a coherent hub interface (CHI) protocol. In such examples, the system 100 can perform distributed virtual memory (DVM) operations (DVMOp) e.g., the CHI protocol can utilize DVM operations to manage the virtual memory. In one embodiment, the DVM operation can include one of the following transactions; transaction lookaside buffer (TLB) (e.g., a memory cache that stores recent translations of virtual memory to physical addresses) invalidation (e.g., invalidating a respective TLB entry if a page has moved in physical memory while associated with the respective TLB entry), instruction cache invalidation (e.g., clear data out of a cache or cache line), branch predictor (e.g., a digital circuit that attempts to predict which way a branch will go before it is known) invalidation (e.g., invalidate virtual address from a branch predictor), or a DVM synchronization (e.g., a check that all previous DVM operations that have been issued or requested are completed). In one example, the SAM 210 can decode a request (e.g., a CHI request) and determine the request is an operation code 415 (e.g., a DVM operation) at the operation decode 410. In one embodiment, a functional unit can process all DVM operations e.g., a functional unit corresponding to functional unit nodeID 330. In such embodiments, the SAM 210 can associate the request and operation code 415 with the functional nodeID 330. Accordingly, the SAM 210 can associate an incoming request with the functional unit nodeID 330 if it determines the request is associated with an operation code 415, a programmable bit of the boot region decode, and bit 310 has a first value (e.g., zero (0)), or if the address 305 is associated with the reserved region 405. That is, the SAM 210 can select multiplexer 430 to assign the Functional Unit NodeID 330 if the operation code is a DVMOp code or select multiplexers 420 and 425 to determine the output 335 if the operation code is not a DVMOp—e.g., the SAM 210 can utilize the boot region decode & bit 310, reserved region decode 405, or hash function 315 when the operation code is not a DVMOp.

In some embodiments, multiplexer 420 is configured to receive outputs from the reserved region decode 405 and the node identification table 320. In some embodiments, the multiplexer 420 can select the functional unit nodeID 330 when receiving a signal from the reserved region decode 405—e.g., select the functional unit nodeID 330 when the address 305 is associated with the reserved region. In other embodiments, the multiplexer 420 can output a node identifier determined at the node identification table 320.

In some embodiments, multiplexer 425 is configured to receive outputs from the multiplexer 420 and the boot region decode and bit 310. In at least one embodiment, the multiplexer 425 can select the functional unit nodeID 330 when receiving a signal from the boot region decode and bit 310—e.g., select the functional unit nodeID 330 when the bit has the first value. In other embodiments, the multiplexer 425 can output the node identifier or the functional unit nodeID 330 received from the multiplexer 420.

In at least one embodiment, multiplexer 430 is configured to receive outputs from the multiplexer 425, and the operation decode 410. In at least one embodiment, the multiplexer 430 can select the functional unit nodeID 330 when receiving a signal from the operation decode 410—e.g., select the functional unit nodeID 330 when the request is associated with an operation (e.g., DVM operation). In other embodiments, the multiplexer 430 can output the node identifier or the functional unit nodeID 330 received from the multiplexer 425.

Figure 5:
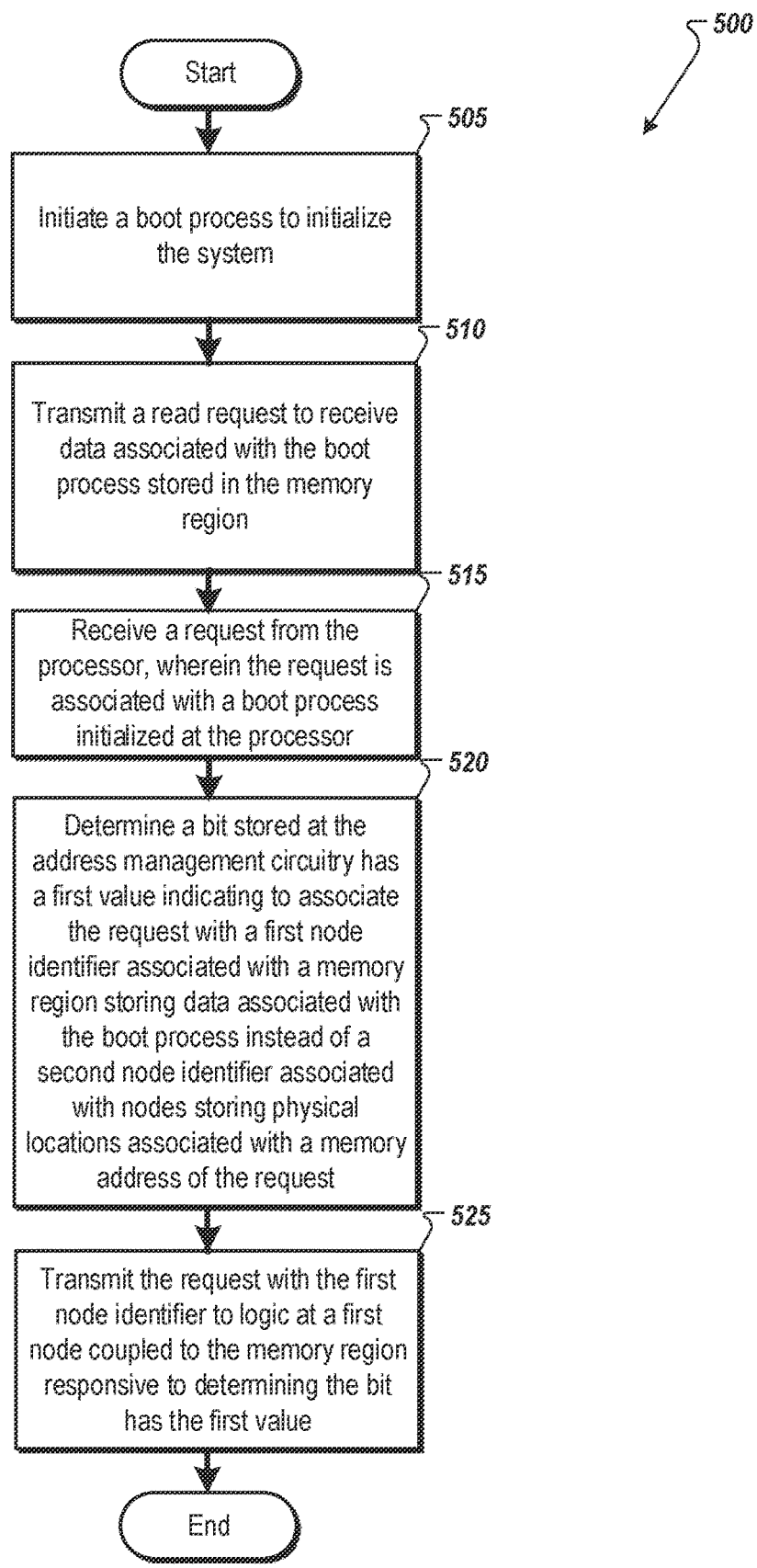
FIG. 5 is a flow diagram for a method for boot initialization without home node involvement, in accordance with at least some embodiments.

FIG. 5 illustrates a flow diagram of a method 500 for boot initialization without home node involvement, according to at least one example embodiment. The method 500 can be performed by processing logic comprising hardware, software, firmware, or any combination thereof. In at least one embodiment, the method 500 is performed by a processor 205, SAM 210, logic 215, home node 230, and MCH core 220 as described with reference to FIGS. 2-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. In some embodiments, the method 500 is performed in a system that includes a functional unit, where the functional units include a processor (e.g., processor 205) and address management circuitry (e.g., SAM 210). In one embodiment, the address management circuitry can include one or more logical components and a node identification table.

At operation 505, processing logic (e.g., the processor 205) can initiate a boot process to initialize the system. In some embodiments, the processing logic can initiate the boot process to bring the functional unit out of reset (e.g., power on the functional unit). In at least one embodiment, the processing logic is to start processing an address space associated with the process during the initialization—e.g., the processing logic can request data from a first address range of the address space during the initialization. In some embodiments, the first address range can be associated with memory storing boot instructions—e.g., the processing logic can begin the initialization by requesting data associated with the first address range.

At operation 510, processing logic can transmit a read request, including the memory address, to receive data associated with the boot process stored in a memory region. In at least one embodiment, the memory address can correspond to the first address range.

At operation 515, processing logic (e.g., logic of the SAM 210) is to receive the request from the processor, where the request is associated with the boot process initialized at the processor. In at least one embodiment, the processing logic can receive an address (e.g., the memory address) in the request associated with the boot process.

At operation 520, processing logic can determine a bit stored at the address management circuitry has a first value indicating to associate the request with a first node identifier associated with a memory region storing data associated with the boot process instead of a second node identifier associated with nodes storing physical locations associated with a memory address of the request. For example, as described with reference to FIGS. 2-4, the address management circuitry can include a programmable bit. In such examples, the address management circuitry can associate an incoming memory address with the first node identifier (e.g., the memory storing the booting instructions) when the bit has the first value. Additionally, the address management circuitry can associate the incoming memory address with a home node (e.g., home node 230 as described with reference to FIG. 2) when the bit has the second value e.g., associate the incoming memory address with the second node identifier. In some embodiments, the bit can have a first value (e.g., zero (0)) during the initialization process. In at least one embodiment, the bit can be reset to the first value (e.g., zero (0)) during a shut-down process of the device such that the bit has the first value each time the device is in the initialization process—e.g., the first value can be the default/reset value of the bit. Accordingly, the address management circuitry can determine to associate the request with the first node identifier during the initialization process. In at least one embodiment, processing logic can associate the request with the first node identifier responsive to determining the bit has the first value. In such embodiments, the processing logic can transmit the read request to the logic responsive to the association.

At operation 525, processing logic can transmit the request with the first node identifier to logic at a first node coupled to the memory region responsive to determining the bit has the first value. For example, processing logic can transmit the first node identifier associated with the memory region storing the boot instructions—e.g., transmit the functional unit nodeID 330 as described with reference to FIGS. 3 and 4. In at least one embodiment, the logic is an example of logic 215 as described with reference to FIGS. 2A and 2B.

In at least one embodiment, the processing logic is to receive the data associated with the boot process from the memory region. For example, the logic can receive the first node identifier and transmit a request to a memory controller hub (e.g., MCH core 220 as described with reference to FIG. 2). The MCH can access the memory and enable the processing logic to receive data associated with the boot process. In at least one embodiment, after receiving the data, the processing logic can program a node identification table of the address management circuitry responsive to receiving the data—e.g., program the node identification table 320 as described with reference to FIGS. 2-4. For example, the processing logic can program a register/table (e.g., entry) for each node storing physical locations. In one embodiment, the processing logic can program all node identification tables across the functional units of system 100—e.g., program all functional units that manage the protocol with the node identifications. In at least one embodiment, the processing logic is to erase one or more caches in the system responsive to receiving the data—e.g., after receiving the data and programming the node identification table. For example, the processing logic can erase all data caches in the system after programming the identification table. In at least one embodiment, the processing logic can also check to ensure all requests associated with the protocol have been executed after programming the node identification table. If the processing logic determines there outstanding requests, the processing logic can complete the requests. In at least one embodiment, the processing logic can determine there are no outstanding requests. In such embodiments, the processing logic can program the bit stored at the address management circuitry to a second value indicating to associate an incoming memory address with the second node identifier associated with the nodes storing physical locations associated with the incoming memory addresses. After programming the bit, the processing logic can enable data cache, a memory management unit, and implement a cache coherency protocol—e.g., the system can be cache incoherent during the initialization and accordingly can erase all caches and execute all requests prior to enabling the data cache.

In some embodiments, after the bit is programmed to the second value, the processing logic can receive a second request from the processor. In such embodiments, the processing logic can determine the bit stored at the address management circuitry has a second value indicating to associate the memory address with the second node identifier associated with the nodes storing physical locations corresponding to received memory addresses. Accordingly, the processing logic can associate the second request with the second node identifier responsive to determining the bit stored as the second value—e.g., the processing logic can utilize the hash function and node identification table after the bit is programmed to the second value as described with reference to FIGS. 2-4. In at least one embodiment, the address management circuitry can transmit to the node of the one or more nodes a node identification value.

In at least one embodiment, the processing logic can receive one or more operation codes corresponding to one or more operations responsive to the processor receiving the data associated with the boot process. In some embodiments, the processing logic can select a second operation code responsive to receiving the one or more operation codes and transmit the second operation code to a second logic component associated with the memory region. For example, as described with reference to FIG. 2, in some embodiments, the MCH core 220 can process certain types of operations (e.g., read no snoop and write no snoop operations). In such examples, the logic can convert any received operation codes to the read no snoop and write no snoop operation codes for the MCH core 220 (e.g., the second logic).

In at least one embodiment, the address management circuitry is to receive an operation code (e.g., operation code 415 as described with reference to FIG. 2). In such embodiments, the address management circuitry can associate the request with the first node identifier. For example, the processing logic can receive a request to perform a distributed memory virtual operation (DVMOp). The processing logic can associate the request with the first node identifier—e.g., the first node can store the boot instructions and process all DVMOp. In at least one embodiment, the processing logic can transmit the first node identifier responsive to determining the request including the operation code.

In at least one embodiment, the address management circuitry can determine the received memory address is not within the address space associated with the home nodes. In such examples, the address management circuitry can determine whether the received memory address is associated with a reserved region. In some embodiments, the address management circuitry can associate the memory address with the first node identifier when the address is associated with the reserved region—e.g., the first node can store data associated with the reserved region, and the address management circuitry can accordingly associate the memory address with the first node.

In at least one embodiment, a device can include one or more logical components and a node identification table. In such embodiments, the one or more logical components (e.g., the boot region decode & bit 310 or hash function 315 as described with respect to FIG. 3) can receive an indication to program the bit stored at the device to a second value indicating to associate an incoming memory address with the second node identifier associated with the nodes storing physical locations associated with the incoming memory addresses.

Figure 6:
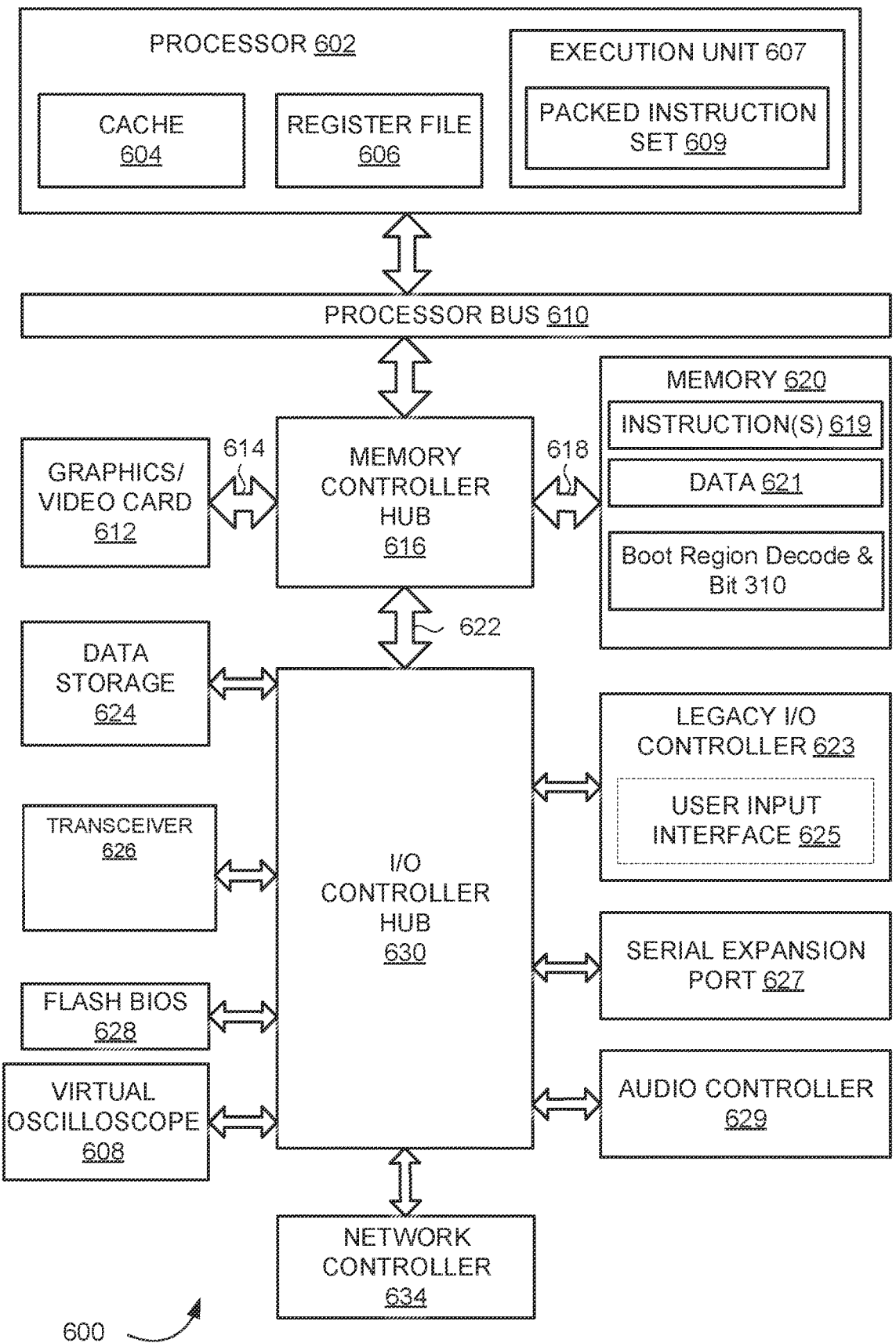
FIG. 6 illustrates an example computer system including a transceiver including a chip-to-chip interconnect, in accordance with at least some embodiments.

FIG. 6 illustrates a computer system 600 in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602, to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read-only memory ("ROM") that stores microcode for certain macro instructions. In at least one embodiment, processor 602 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 600 and to bridge data signals between processor bus 610, memory 620, and a system I/O 622. In at least one embodiment, system logic chip may provide a graphics port for coupling to a graphics controller. In at least one embodiment, MCH 616 may be coupled to memory 620 through high bandwidth memory path 618, and graphics/video card 612 may be coupled to MCH 616 through an Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, a local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage device. In an embodiment, the transceiver 626 includes a constrained FFE 608.

In at least one embodiment, FIG. 6 illustrates a system, which includes interconnected hardware devices or "chips" in a transceiver 626—e.g., the transceiver 626 includes a chip-to-chip interconnect including a first device and a second device. In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof and utilize a GRS link. In at least one embodiment, one or more components of system 600 are interconnected using compute express link ("CXL") interconnects. In an embodiment, the memory 620 can include a boot region decode and bit 310 as described with reference to FIG. 3. In one example, the boot region decode and bit 310 can indicate whether to associate an incoming memory address with a first node identifier (e.g., with a memory region storing boot instructions) or with a second node identifier (e.g., with a node of a set of nodes storing physical locations corresponding to the incoming memory addresses) as described with reference to FIGS. 2-5—e.g., the memory 620 can associate with the first node identifier or the second node identifier based on a value of the bit stored at the address manager.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A system comprising:
   a first node coupled to a memory region storing data associated with a boot process, wherein the first node comprises a boot handler and a first node identifier;
   a second node comprising a second node identifier associated with one or more nodes storing physical locations associated with a memory address; and
   a functional unit comprising a processor and address management circuitry, the address management circuitry configured to:
   receive a request from the processor, wherein the request comprises the memory address associated with the second node identifier and is associated with the boot process initialized at the processor;
   determine that a bit stored at the address management circuitry has a first value indicating to associate the request with the first node identifier bypassing the second node; and
   transmit the request with the first node identifier to the boot handler at the first node in response to determining the bit has the first value.

2. The system of claim 1, wherein the processor is configured to:
   receive the data associated with the boot process from the memory region; and
   program a node identification table of the address management circuitry in response to receiving the data.

3. The system of claim 1, wherein the processor is configured to:
   receive the data associated with the boot process from the memory region;
   erase one or more caches in the system in response to receiving the data; and
   program the bit to a second value indicating to associate incoming memory addresses with the second node identifier in response to erasing the one or more caches.

4. The system of claim 1, wherein the processor is configured to:
   receive the data associated with the boot process from the memory region; and
   program the bit stored at the address management circuitry to a second value indicating to associate an incoming memory address with the second node identifier.

5. The system of claim 1, wherein the boot handler coupled to the memory region is configured to:
   receive one or more operation codes corresponding to one or more operations in response to the processor receiving the data associated with the boot process;
   select a second operation code in response to receiving the one or more operation codes; and
   transmit the second operation code to a logic component associated with the memory region.

6. The system of claim 1, wherein the address management circuitry is further configured to:
   receive a second request from the processor;
   determine that the bit stored at the address management circuitry has a second value indicating to associate an incoming memory address with the second node identifier; and
   associate the second request with the second node identifier in response to determining the bit stored has the second value.

7. The system of claim 6, wherein the address management circuitry is further configured to:
   transmit, to the one or more nodes, a node identification value.

8. The system of claim 7, wherein the processor is further configured to:
   receive data from a memory region in response to the address management circuitry transmitting the node identification value to the one or more nodes.

9. The system of claim 1, wherein the address management circuitry is further configured to:
   associate the request with the first node identifier in response to determining the bit has the first value, wherein the address management circuitry is configured to transmit the request to the boot handler in response to associating the request with the first node identifier.

10. A device comprising:
    one or more logical components and a node identification table, wherein the one or more logical components are configured to:
    receive a request associated with a boot process, the request identifying a memory address;
    determine that a bit stored at the device has a first value indicating to associate the request with a first node identifier associated with a memory region storing data associated with the boot process bypassing a second node identifier associated with nodes storing physical locations associated with the memory address of the request; and
    associate the request with the first node identifier in response to determining the bit has the first value.

11. The device of claim 10, wherein the one or more logical components are configured to:
    receive an indication to program the bit stored at the device to a second value indicating to associate an incoming memory address with the second node identifier associated with the nodes storing physical locations associated with the incoming memory addresses.

12. The device of claim 10, wherein the one or more logical components are configured to:
    transmit the request with the first node identifier to logic at a first node coupled to the memory region, in response to determining the bit has the first value.

13. The device of claim 10, wherein the one or more logical components are configured to:
    receive a second request from a processor;
    determine that the bit stored at address management circuitry has a second value indicating to associate the memory address with the second node identifier associated with the nodes storing physical locations corresponding to received memory addresses; and associate the second request with the second node identifier in response to determining that the bit stored has the second value.

14. The device of claim 13, wherein the one or more logical components are configured to:

transmit, to the nodes, a node identification value.

15. The device of claim 10, wherein the node identification table is to:

receive information corresponding to a table indicating one or more nodes storing physical locations associated with memory addresses, wherein the node identification table is to be programmed in response to receiving the information.

16. A method, comprising:

receiving a request from a processor of a functional unit comprising the processor and address management circuitry, wherein the request comprises a memory address associated with a node storing physical locations associated with the memory address, wherein the request is associated with a boot process initialized at the processor;

determining that a bit stored at the address management circuitry has a first value indicating to associate the request with a first node identifier associated with a memory region storing data associated with the boot process bypassing a second node storing physical locations associated with the memory address of the request; and transmitting the request with the first node identifier to logic at a first node coupled to the memory region in response to determining that the bit has the first value.

17. The method of claim 16, further comprising:

transmitting, to the processor, the data associated with the boot process from the memory region; and programming a node identification table of the address management circuitry in response to receiving the data.

18. The method of claim 16, further comprising:

receiving, at the processor, the data associated with the boot process from the memory region;

erasing one or more caches in a system in response to receiving the data; and programming the bit to a second value to associate incoming memory addresses with a second node identifier associated with the second node storing physical locations associated with the incoming memory addresses, in response to erasing the one or more caches.

19. The method of claim 16, further comprising:

receiving, at the address management circuitry, a second request from the processor;

determining that the bit stored at the address management circuitry has a second value indicating to associate an incoming memory address with a second node identifier associated with the second node storing physical locations corresponding to the incoming memory address; and associating the second request with the second node identifier in response to determining the bit stored has the second value.

20. The method of claim 16, further comprising:

associating the request with the first node identifier in response to determining the bit has the first value, wherein transmitting the request to the logic is in response to associating the request with the first node identifier.

* * * * *